(12) United States Patent
Levin (10) Patent No.: US 8,122,813 B2
(45) Date of Patent: Feb. 28, 2012

(54) BREWING ELEMENT WITH A CENTRAL INLET

(76) Inventor: Shalom Levin, Atlit (IL)

( * ) Notice: Subject to any disclaimer, the term of this patent is extended or adjusted under 35 U.S.C. 154(b) by 315 days.

(21) Appl. No.: 11/814,677

(22) PCT Filed: Jan. 26, 2006

(86) PCT No.: PCT/IL2006/000114
§ 371 (c)(1),
(2), (4) Date: Jul. 25, 2007

(87) PCT Pub. No.: WO2006/080016
PCT Pub. Date: Aug. 3, 2006

(65) Prior Publication Data
US 2009/0101022 A1    Apr. 23, 2009

(51) Int. Cl.
*A47J 31/00* (2006.01)
(52) U.S. Cl. .................................. 99/295; 99/302 R
(58) Field of Classification Search ............ 99/279–323, 99/275–277, 468, 295, 302 R, 323.3; 426/466–470, 426/231–233, 433, 112, 77, 78, 79
See application file for complete search history.

(56) References Cited

U.S. PATENT DOCUMENTS

| | | | | |
|---|---|---|---|---|
| 1,075,727 A | * | 10/1913 | Reichert | 99/294 |
| 1,377,316 A | * | 5/1921 | Clermont | 99/306 |
| 2,905,075 A | * | 9/1959 | Liebelt | 99/295 |
| 2,926,594 A | * | 3/1960 | Werner et al. | 99/295 |
| 3,347,151 A | * | 10/1967 | Ronalds | 99/295 |
| 4,382,402 A | | 5/1983 | Alvarez | |
| 5,111,740 A | * | 5/1992 | Klein | 99/295 |
| 5,127,318 A | * | 7/1992 | Selby, III | 99/295 |
| 5,150,645 A | * | 9/1992 | Schiettecatte | 99/295 |
| 5,197,373 A | * | 3/1993 | De Jong | 99/283 |
| 5,265,518 A | * | 11/1993 | Reese et al. | 99/280 |
| 5,267,506 A | * | 12/1993 | Cai | 99/280 |
| 5,390,587 A | * | 2/1995 | Wu | 99/279 |
| 5,408,918 A | * | 4/1995 | King et al. | 99/289 R |
| 5,463,933 A | * | 11/1995 | Landais | 99/285 |
| 5,463,935 A | * | 11/1995 | Zanarini | 99/292 |
| 5,598,764 A | * | 2/1997 | Bambi | 99/295 |
| 6,202,541 B1 | | 3/2001 | Cai | |
| 6,220,147 B1 | * | 4/2001 | Priley | 99/323 |
| 6,658,989 B2 | | 12/2003 | Sweeney et al. | |
| 6,722,265 B2 | * | 4/2004 | Priley | 99/299 |
| 6,740,345 B2 | | 5/2004 | Cai | |

FOREIGN PATENT DOCUMENTS

DE      3425540    *  1/1988  .................. 99/295

\* cited by examiner

*Primary Examiner* — Reginald L Alexander
(74) *Attorney, Agent, or Firm* — Law Offices of Edward Langer (57) ABSTRACT

A brewing element comprising an envelope for storing at least one comestible brewing ingredient therein; and an attachment means for removably attaching the element to a container, the element having formed therein a central inlet for admitting pressurized, heated water and a peripheral outlet for releasing a mixture of the at least one comestible brewing ingredient with the pressurized, heated water, wherein when the brewing element is incorporated into an operating beverage brewing system, the capsule releases the mixture multi-directionally through the peripheral outlet to provide a brewed beverage into the container.

21 Claims, 9 Drawing Sheets

BREWING ELEMENT WITH A CENTRAL INLET

FIELD OF THE INVENTION

The present invention is related to beverage brewing elements and systems, and in particular, to a brewing element provided with a central perforated inlet for use in espresso-type machines and portable beverage brewing systems.

BACKGROUND OF THE INVENTION

A small, cylindrical chamber is used in home and office espresso machines to hold a cylindrical capsule or pod containing a measured amount of dry, ground materials used in brewing, such as coffee. The cylindrical chamber, generally made of aluminum foil or heat-resistant plastic, encloses the capsule, and the top and the base of the cylinder are perforated to allow pressurized, heated water to enter the cylinder from the top, flushing axially through the capsule and exiting through the perforated base as an espresso beverage directed from a spout into a receptacle, such as a coffee cup.

Since the espresso preparation procedure involves the use of high pressure water flushing through the brewing materials, such as ground coffee, and this pressure develops very high radial forces on the face of the cylinder envelope, a very rigid, construction is needed to support the capsule and seal the capsule faces during the preparation process. Such rigid construction increases the cost of producing the brewing machine and the cost to the consumer is like-wise higher.

The problem of rigid construction of a capsule for espresso machines also applies to portable brewing systems since the capsule for the dry comestibles need to be held firmly in place on all sides while being subjected to the pressure of heated water applied axially to the capsule and this action produces very high forces both in axial and radial directions.

In U.S. Pat. No. 4,382,402 to Alvarez, for example, the inventor describes a portable coffee maker having a water-heating chamber and a coffee-brewing chamber. This prior art invention has the disadvantage of requiring a rigid support for the separate chambers which adds to the cost of the system.

In U.S. Pat. No. 6,740,345 to Cai, the inventor describes the use of a rigid wall construction of a cartridge which is bulb-shaped and which, dispenses its ingredients when impacted by heated, pressurized water passed axially from an upper, impermeable chamber to the lower one utilizing a through opening in the cartridge. The rigid wall construction of cartridges is more costly to manufacture, as heretofore mentioned, and therefore may result in a product that is expensive when made for one-time use. It also creates greater waste since the sturdier materials tend to be harder on the environment than might be desirable.

In U.S. Pat. No. 6,658,989 to Sweeney el al, the inventor describes a re-usable beverage filter cartridge in a cup-shaped housing provided with dual chambers, closed at the bottom, and having an outlet port. The cartridge is subjected to a stream of heated, pressurized water to mix with the ingredients in a first chamber, and, after passing through a filtering medium, the resultant brew is directed into a second chamber. The disadvantage noted heretofore applies to this cartridge as well, since it is manufactured with a rigid, structure comprising dual chambers.

SUMMARY OF THE INVENTION

The present invention is an improvement over the prior art by providing a new and improved type of brewing element which eliminates the need for rigid and complicated construction or the provision of a supportive structure, such as a special rigid chamber, which is ordinarily needed to firmly hold the capsule in place in a beverage-brewing device during the preparation process.

Therefore it is an object of the present invention to provide a brewing element comprising: a capsule for storing at least one comestible brewing ingredient therein; and an attachment means for removably attaching the element to a container, the element having formed therein a central inlet for admitting pressurized, heated water and a peripheral outlet for releasing a mixture of the at least one comestible brewing ingredient with the pressurized, heated water, wherein when the brewing element is incorporated into an operating beverage brewing system, the capsule releases the mixture multi-directionally through the peripheral outlet to provide a brewed beverage into the container.

This new type of brewing element will also allow the production of a more flexible, greatly simplified, and less-expensive mechanism for the next generation of espresso machines.

The inventive concept is based on a brewing element formed as a hollow, cylindrical capsule having a toroidal-like shape, like that of a car tire, containing at least one ingredient for making a brewed beverage. The hollow capsule is perforated in its central bore and about its outer surface in such a way as to provide for the passage of high-pressure water into and out of the envelope of the capsule. A novel feature of this capsule is that it provides multi-directional venting of the brew through perforations in the outer wall of the envelope along its periphery.

The pressurized water enters the capsule through a tube inserted axially into the centrally disposed bore of the capsule and flows out by flushing through the brewing material contained in the envelope in multiple directions, both axially and radially. The mixed brew exits the capsule through the outer, perforated envelope. A finger-like tube with a few radial drills tightly engages with the central opening of the capsule and supplies the pressurized water through the central bore which is advantageously provided with a perforated surface so as to allow the pressurized water to flush through the brewing materials, such as ground coffee, or any other comestible suitable for brewing.

Since forces are both axial and radial, there is no further need to axially support the capsule as is commonly done in existing espresso systems. In the case of the present invention, the axial force needed to hold the capsule in place is the water pressure multiplied by the inlet tube section area which is negligible compared to the face of a conventional capsule. The ratio is about 1:20 in the sections and therefore 1:20 in holding forces. For example, for 16 bar machines the holding force ratio will be 2.4 kg. against 48 kg.

The internal radial forces will blow the capsule upon application of pressure from the water rapidly filling the inside of the toroidal-like capsule. The unique properties of the toroidal-like shape will cause it to behave much as a car tire which it resembles, but just as a tire, which is made of pliable rubber, can hold an internal pressure without any external support, so too the capsule will retain sufficient strength to fulfill its function and dispense a hot brewed beverage.

BRIEF DESCRIPTION OF THE DRAWINGS

Attention is now directed to the attached drawings, wherein like reference numerals or characters indicate corresponding or like components. In the drawings.

DETAILED DESCRIPTION OF THE EMBODIMENTS

Figure 1:
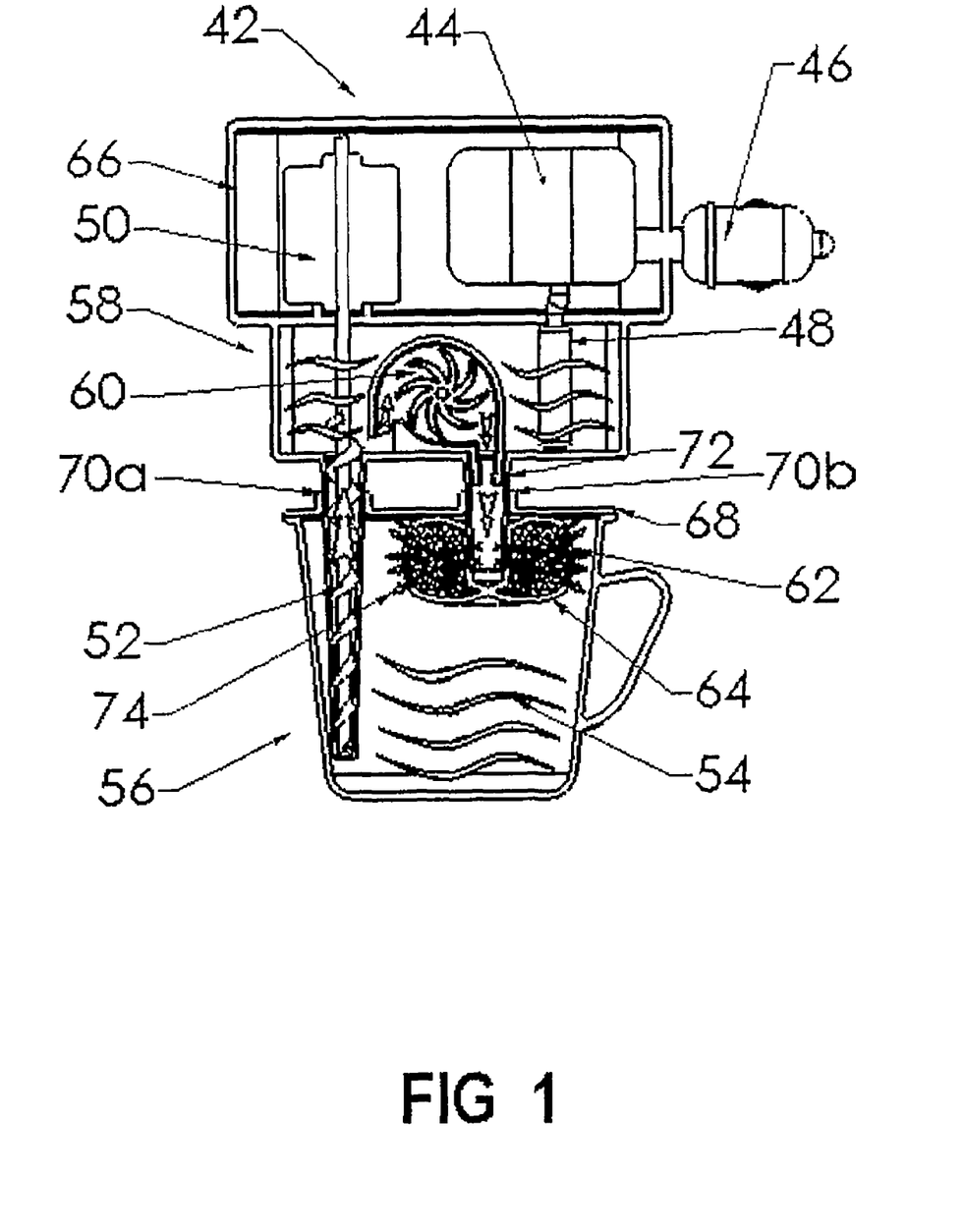
FIG. 1 is a cross-sectional view of an embodiment of the capsule of the present invention shown connected directly to a high-pressure water pump in a portable beverage brewing system.

FIG. 1 is a cross-sectional view of an embodiment of the capsule of the present invention shown connected directly to a high-pressure water pump in a portable beverage brewing system, such as an espresso machine.

The portable beverage brewing system comprises: a power and control unit 44 connected to a power source connector 46, for example, an auto cigarette lighter plug, and connected to a length of heater element 48 for heating the water for making a brew; a water suction pump 50 and suction tube 52 for drawing water 54 (shown as wavy lines) from a container 56, such as a cup, into the hot water pumping section 58; a high pressure pump 60 to create the necessary pressure to flush the water through the inner and outer envelope 62 of a brewing element 64, such as the toroidal-like capsule of the present invention; and a housing unit 66 for containing the various power and control components of the system which is shown mounted as a sealed unit to cup 56 where the brew is collected.

Note that the housing unit 66 is removable after the brew has been prepared and may be reused with the same container simply by selecting a new cover with another brewing element. Container 56 is provided with a cover 68 having two inlets 70a/b to accommodate and attach the housing unit to container 56. One inlet 70a introduces suction tube 52 into container 56 (and may also be used as a mouthpiece for drinking the prepared brew) while the other admits nozzle 72 into the central bore of brewing element 64, thus allowing pressurized water to flow (as shown by down arrow) through inlet 70b when the espresso machine is turned on and operating.

Cover 68 serves as an attachment means for the brewing element of the invention. The brewing element is attached to the underside of cover 68. The cover acts as a register to align the capsule so that it fits into cup 56 in the center and the capsule is also spaced apart from the adjacent surfaces of the inside of cup 56. This is necessary in order for the vented brew to exit the peripheral outlet. This feature allows a user to choose alternate brews for drinking simply by replacing the covers on the container.

Note also that brewing element 64 is provided with a perforated envelope which allows multi-directional venting of the mixed brew. The flushed brew flows not just axially downward as in prior art brewing elements, but also radially outward, as shown by the multiple arrows 74, and thus fill container 56 with a predetermined volume of a heated brew, such as coffee.

Figure 2:
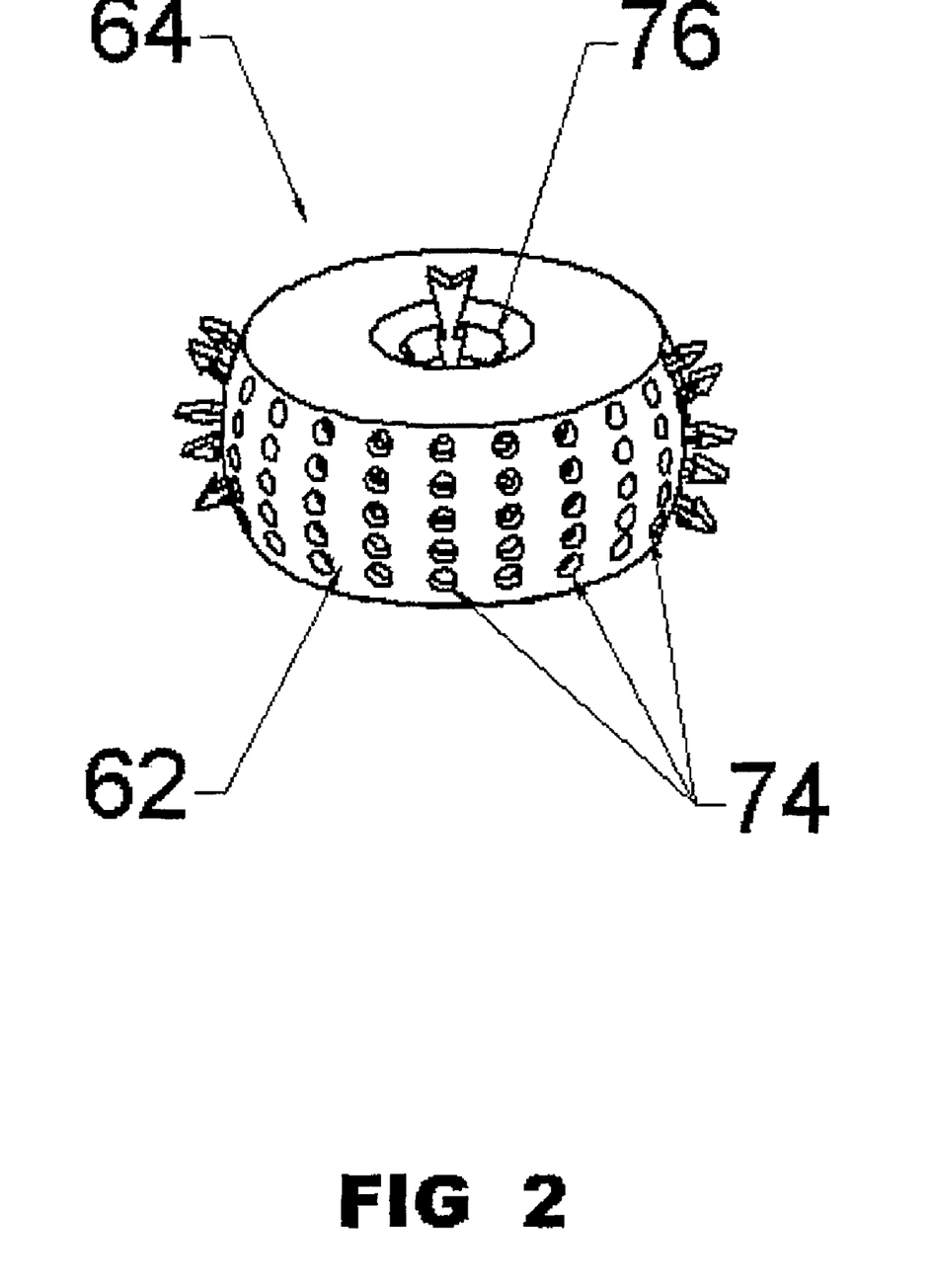
FIG. 2 is an isometric drawing of the embodiment of the capsule shown in FIG. 1 indicating the flow of pressurized water into the capsule through a central bore inlet and out of the capsule through perforations in the outer envelope.

FIG. 2 is an isometric drawing of the embodiment of the capsule shown in FIG. 1 indicating the flow of pressurized water into the capsule through a central bore inlet and out of the capsule through perforations in the outer envelope.

The perforated capsule 64 is shown with inlet 76 that serves to admit pressurized water (indicated by downward arrow) to flush a brew through the perforations 74 in perforated envelope 62 when capsule 64 is inserted into an espresso machine and the machine is operated.

It should be noted that although the perforations shown in FIG. 2 (and also FIG. 7) are formed in a uniform manner on the outer periphery of the brewing element, alternate arrangements or even random placement may also be utilized and it is not to be construed as a limitation of the present invention, but this arrangement is only shown by way of example.

A fabric or paper filter (not shown) is used between the ground coffee and the perforated envelope 62. Note that the novel toroidal-like shape of the capsule 64 provides sufficient structural support to permit use of it without the use of complicated supporting members or ribbing in either an espresso machine or in the retaining cup of a portable brewing system. This feature allows for a simpler and less expensive construction of espresso machines and related systems.

Figure 3:
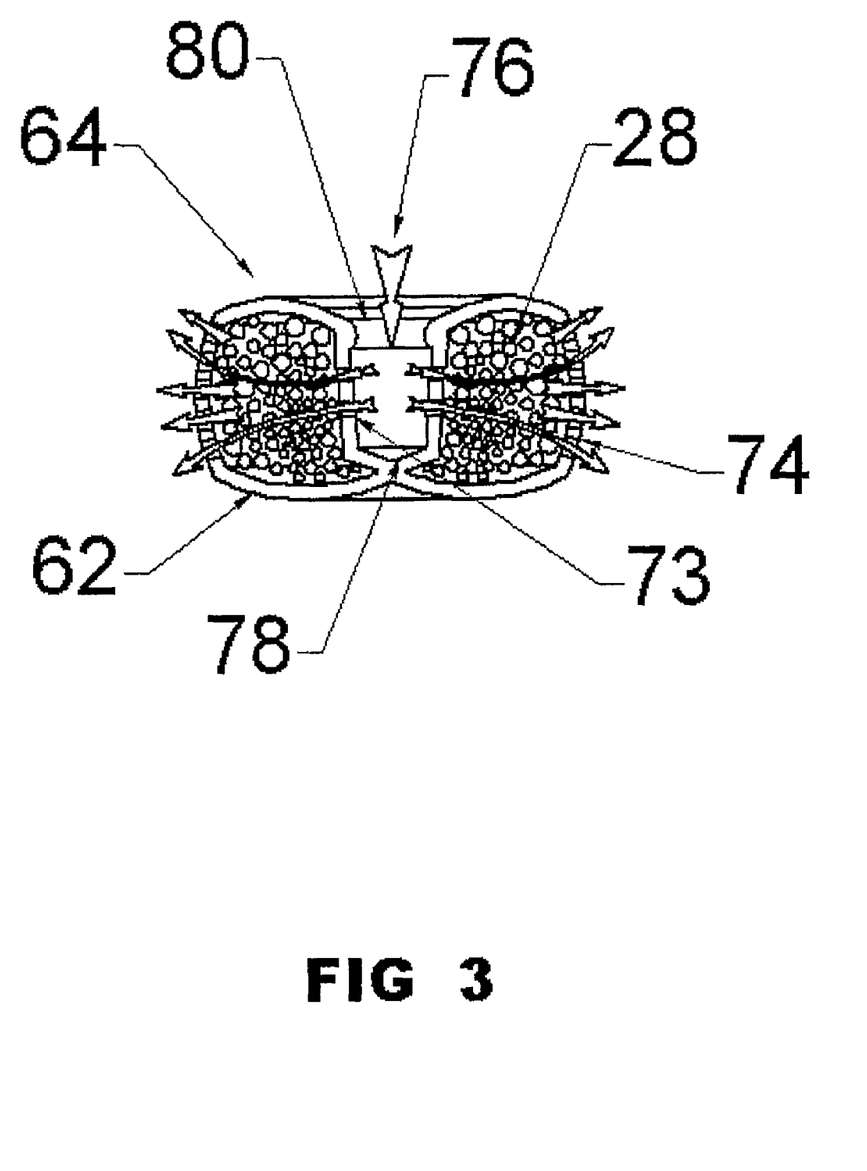
FIG. 3 is a cross-sectional view of the embodiment of the invention of FIG. 2.

FIG. 3 is a cross-sectional view of the embodiment of the invention of FIG. 2. The lower end 78 of inlet 76 is closed forming a blind bore. Inlet 76 is also provided with a tight seal 80 around its lip to firmly attach a high pressure water tube (see FIG. 4) such as from an espresso machine. The pressurized water is forced through holes 73 in the walls of the inlet 76 and flushes through a brewing preparation 28, such as coffee. Multiple arrows indicate the direction of pressurized water flow exiting through perforations 74 in the outer wall of the capsule 64.

Figure 4:
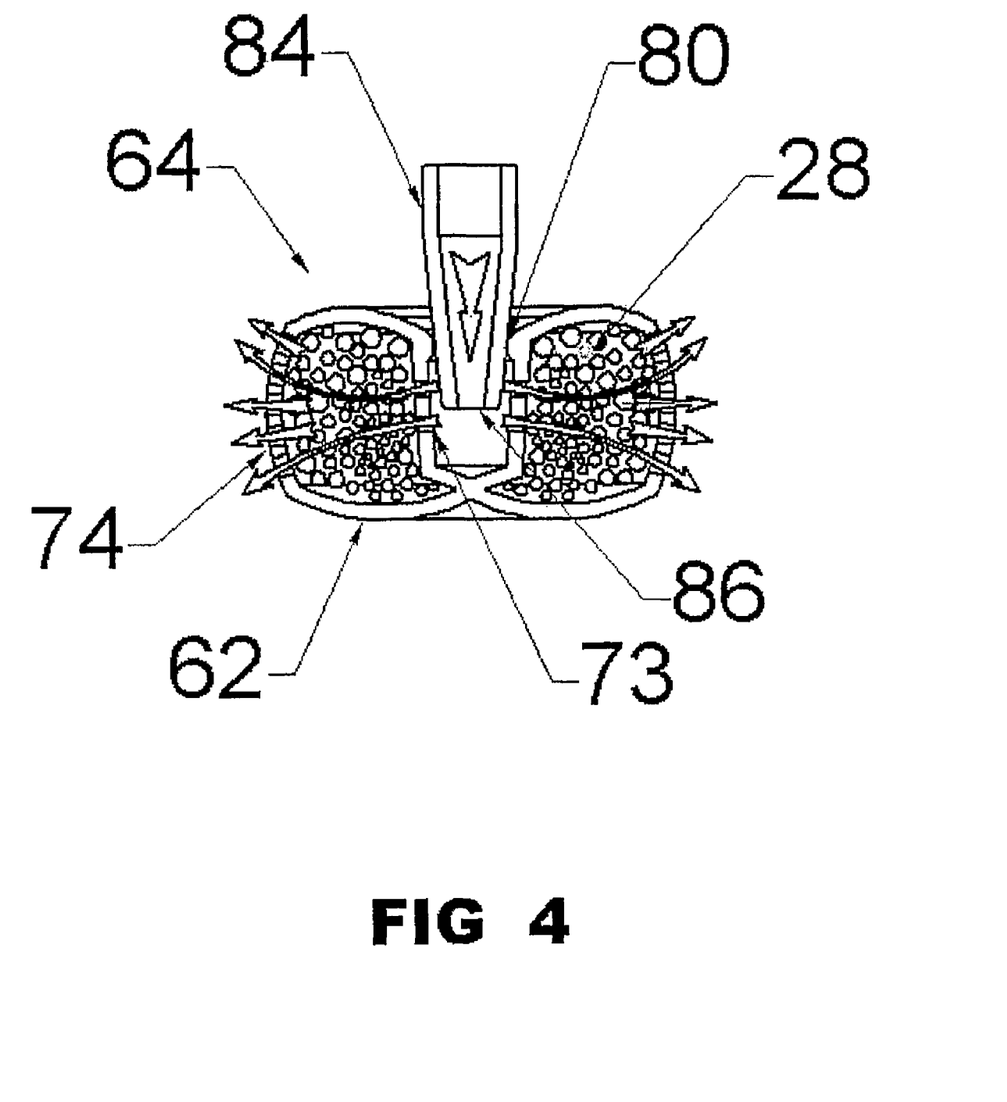
FIG. 4 is a cross-sectional view of an implementation of the capsule of FIG. 3 showing an inlet tube having an open end inserted into the central blind bore.

FIG. 4 is a cross-sectional view of an implementation of capsule 64 of FIG. 3 showing a pressurized water inlet tube 84, having an open end 86 inserted into inlet 76 (see FIG. 3) to allow pressurized water to be introduced into capsule 64 to flush through and flush out the brewing preparation 28, such as coffee, contained therein. The inlet tube 84 is held snugly in place by seal 80. Arrows indicate the radial dispersion and flushing of pressurized water through bore holes 73 and perforations 74.

Figure 5:
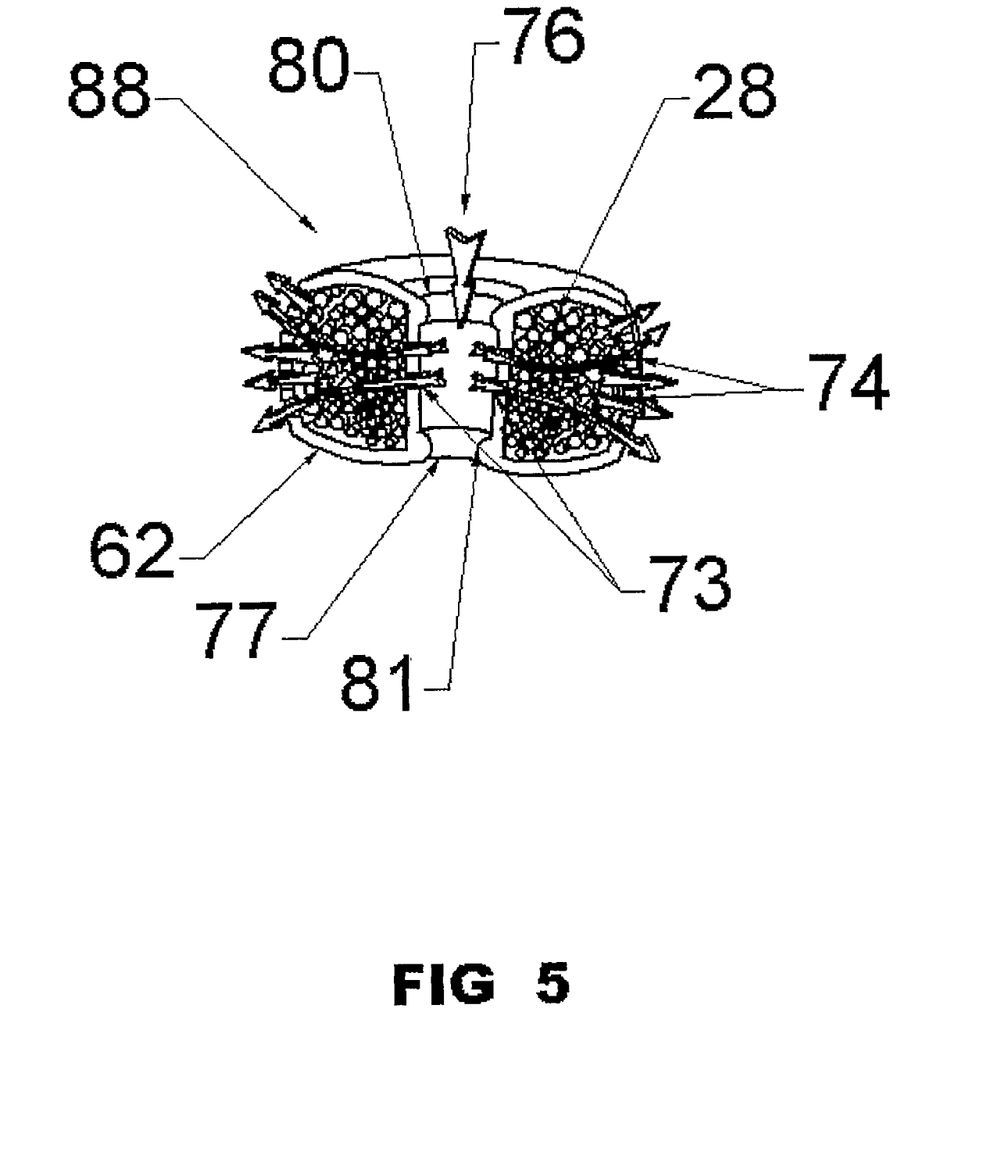
FIG. 5 is a cross-sectional view of another embodiment of the present invention provided with a through-hole in its central bore.

FIG. 5 is a cross-sectional view of another embodiment of the present invention provided with a through-hole in its central bore defined by inlet 76 and outlet 77. A seal 81 is provided around the circumference of the through-hole at both inlet 76 and outlet 77.

Figure 6:
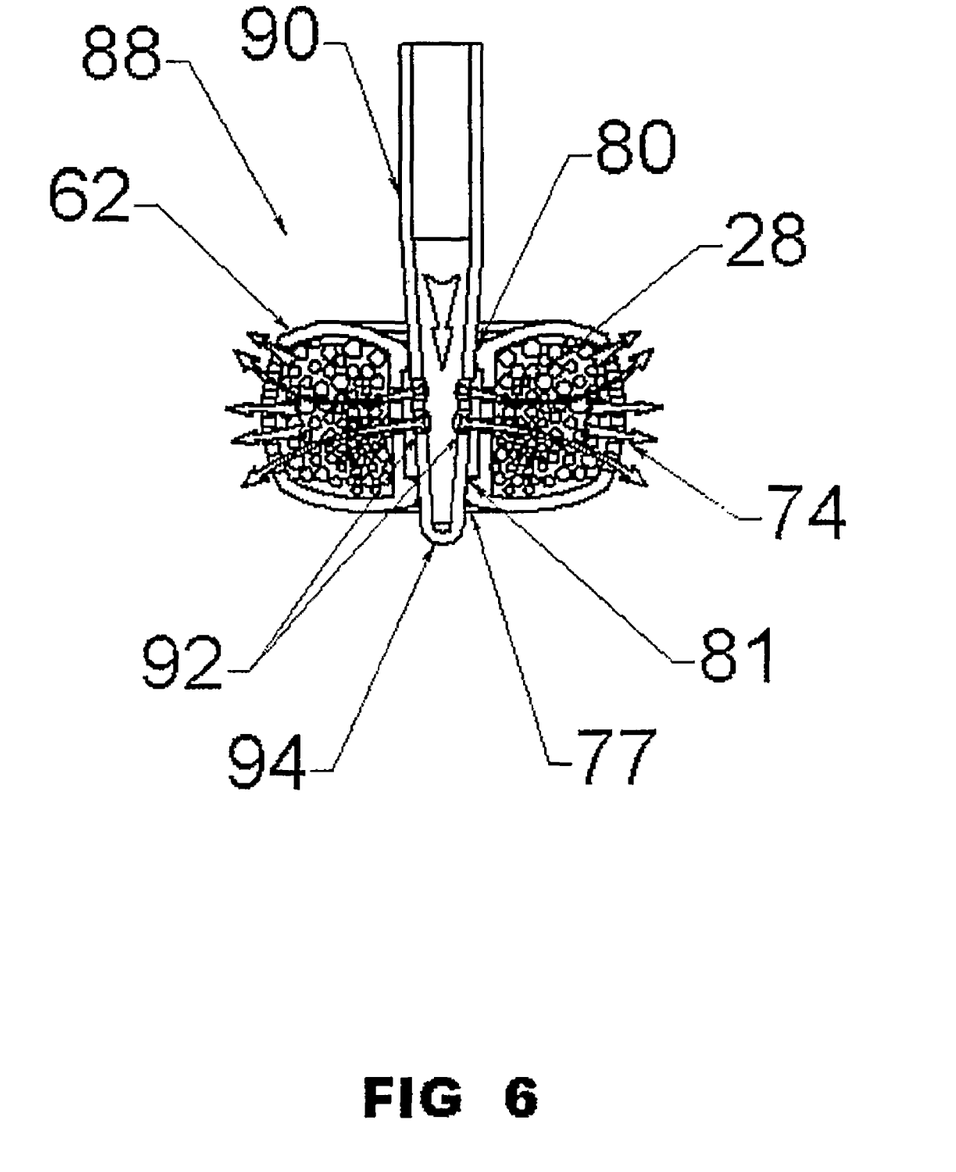
FIG. 6 is a cross-sectional view of an implementation of the capsule of FIG. 5 shown fitted with a closed-ended inlet tube.

FIG. 6 is a cross-sectional view of an implementation of the invention of FIG. 5 shown fitted with a closed-ended inlet tube.

In this embodiment of the present invention, capsule 88 is fitted with a closed-ended inlet tube 90 provided with a few radial holes 92 to admit pressurized water (shown by downward arrow) into the capsule brewing element 88 and to flush through and flush out the brewing preparation 28, such as coffee, contained therein through the perforations 74 in the outer envelope 62 of capsule brewing element 88. Note that inlet tube 90 extends below the through hole 77 and is closed at tube end 94.

Figure 7:
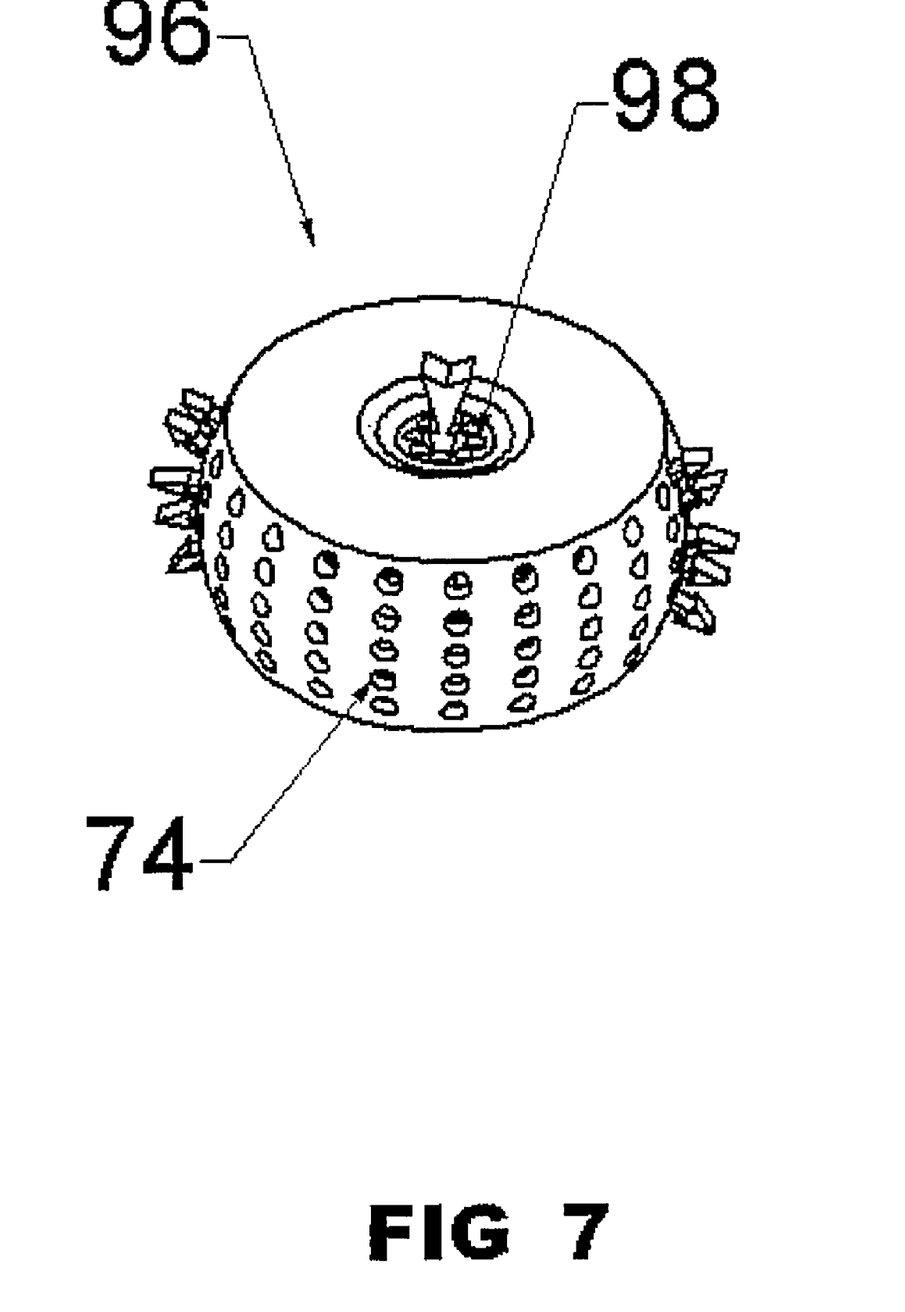
FIG. 7 is an isometric view of another embodiment of the invention provided with a small, perforated media, sealed into and partially blocking the inlet to a central bore.

FIG. 7 is an isometric view of another embodiment of the invention provided with a small, perforated media, sealed into and partially blocking the inlet to a central bore, Capsule brewing element 96 is also toroidal-like shape to provide structural strength. It is fitted with perforations 74 on the outside wall of the envelope forming a peripheral outlet for venting a pressurized brew into a cup or other container in an espresso brewing system. In this embodiment of the invention, the inlet (indicated by downward arrow) to the central bore (not visible) is sealed with a perforated media 98, such as an inlet cap.

Figure 8:
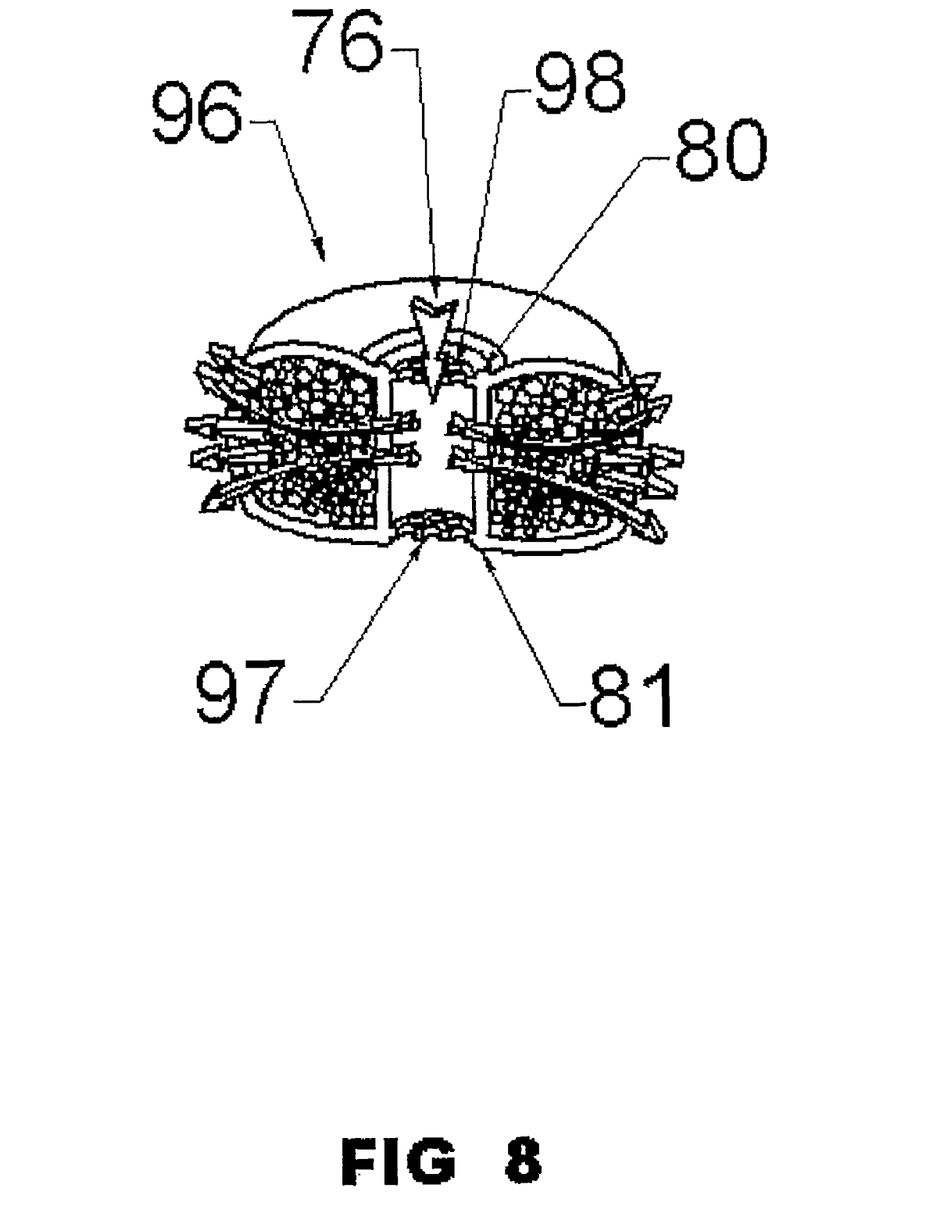
FIG. 8 is a cross-sectional view of yet another embodiment of the invention shown in FIG. 7.

FIG. 8 is a cross-sectional view of yet another embodiment of the invention shown in FIG. 7. Note that both ends of central bore 76 are partially blocked by the perforated media 98 and 97 respectively. Both upper and lower lips of the central bore 76 are provided with seals 80 and 81, respectively.

Figure 9:
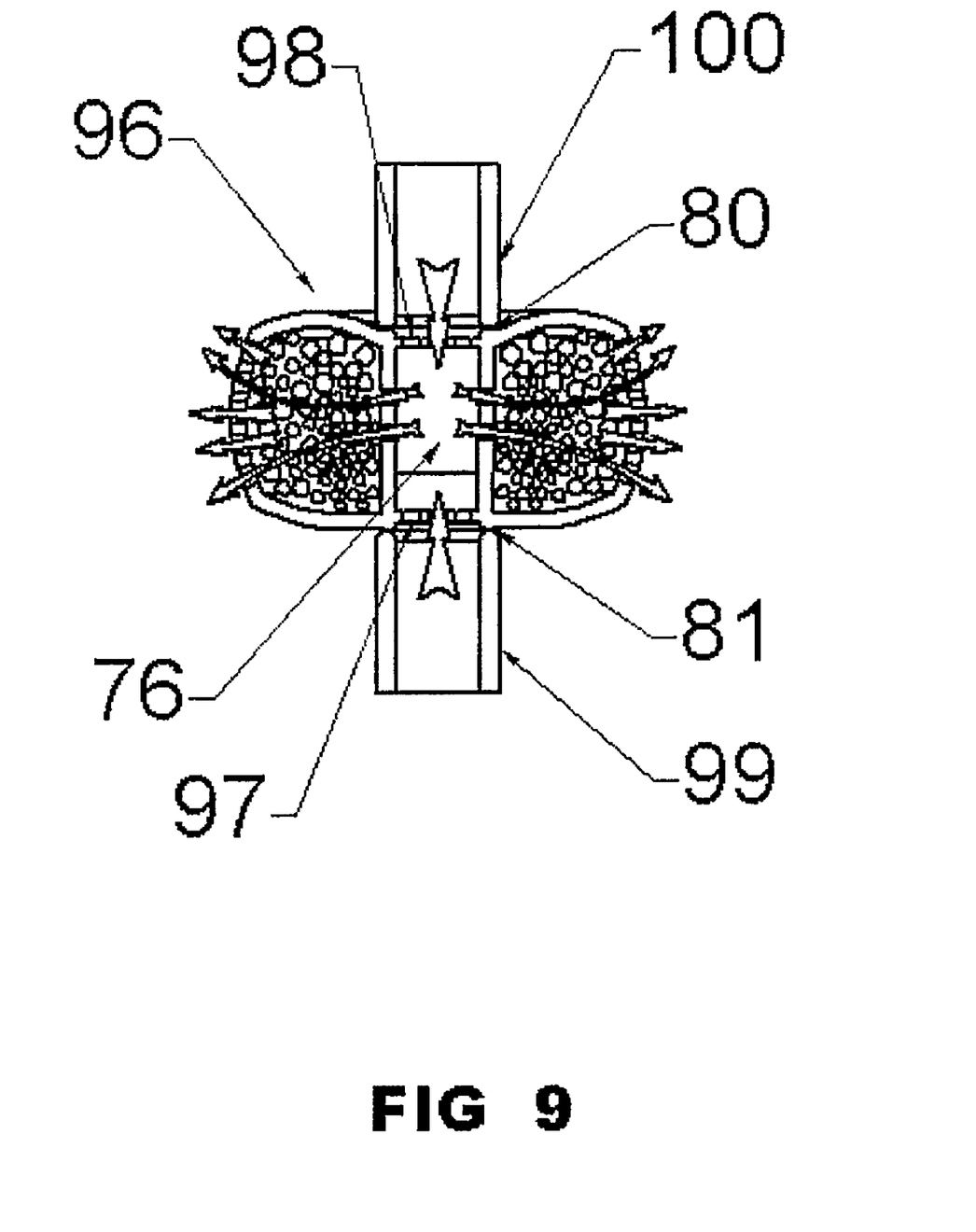
FIG. 9 is a cross-sectional view of an implementation of the embodiment of FIG. 8 showing an application wherein a pair of inlet tubes are shown removably attached to each end of a central bore.

FIG. 9 is a cross-sectional view of an implementation of the embodiment of FIG. 8 showing an application wherein a pair of inlet tubes are shown removably-attached to each end of a central bore. An upper tube 100 and a lower tube 99 are removably-attached to the inlet 76 of capsule brewing element 96. The tubes are constructed so as to fit snugly into the upper and lower inlets 76 in the respective ends of the central bore and held in place by seals 80 and 81, respectively. The tubes 100, 99 are immobilized against perforated media 98, 97 and pressurized water (indicated by broad arrows) are partially blocked from entering the inlets 76 except through the perforations in the perforated media 97, 98.

It should be noted that if the capsule brewing element in the implementation described above is fitted with only one open-ended tube, either upper tube 100 or lower tube 99, it is recommended to insert a blocking cylinder (not shown) on the other end to balance the axial force resulting from water pressure when pressurized water is admitted into the inlet 76 to the central bore.

Having described the present invention with regard to certain specific embodiments thereof, it is to be understood that the description is not meant as a limitation, since further modifications may now suggest themselves to those skilled in the art, and it is intended to cover such modifications as fall within the scope of the appended claims of the present invention.

What is claimed is:

1. A brewing element having a central inlet, said brewing element comprising:
   a toroidal capsule for storing at least one comestible brewing ingredient therein, said toroidal capsule comprising:
      a central bore formed along the central axis of said capsule for admitting hot, high-pressure water into said capsule; and
      a peripheral outlet formed in the outer walls of said capsule for releasing into a container a mixture of said at least one comestible brewing ingredient together with said hot, high-pressure water; and
   an attachment means for removably attaching said brewing element to said container, wherein said attachment means is a cover for said container, said toroidal capsule being attached to the underside of said cover and disposed within said container when said cover is mounted thereon.

2. The brewing element of claim 1, wherein said toroidal capsule is radially perforated along the walls of said toroidal capsule defining said central bore.

3. The brewing element of claim 2, wherein when said hot, high-pressure water is admitted into said capsule through said perforated central bore wall, such water exerts minimal to zero axial force thereon.

4. The brewing element of claim 1, wherein said peripheral outlet comprises perforations formed along the outermost wall of said toroidal capsule.

5. The brewing element of claim 1, wherein said cover is fixedly attached to said container.

6. The brewing element of claim 1, wherein said cover is removably attachable to said container.

7. The brewing element of claim 1, wherein said cover when attached to said container, acts as a register to orient said toroidal capsule in a predetermined position in relation to said container for connection to a high-pressure source of heated water.

8. The brewing element of claim 1, wherein said toroidal capsule is formed from flexible material able to withstand internal pressure and is self-supporting without the need for any external support.

9. The brewing element of claim 1, wherein said central bore is formed eccentric to the central axis of said toroidal capsule.

10. The brewing element of claim 1, wherein said central bore comprises a blind bore provided with a seal to form a high-pressure water inlet.

11. The brewing element of claim 10, wherein said central bore has inserted therein an open-ended tube positioned coaxially with said blind bore and provided with a seal to form a high-pressure water inlet.

12. The brewing element of claim 11, wherein said central bore comprises a through-bore.

13. The brewing element of claim 12, wherein said through-bore has inserted therein said tube with at least one radial drill positioned coaxially with said central inlet.

14. The brewing element of claim 12, wherein said through-bore is provided with a seal at both ends thereof to form a high-pressure water inlet.

15. The brewing element of claim 1, wherein said central bore comprises a double blind-bore.

16. The brewing element of claim 15, wherein said double blind-bore is closed at both ends by a perforated media partially blocking the inlets to said double blind-bore.

17. The brewing element of claim 16, wherein said double blind-bore has inserted therein said tube comprising at least one open-ended tube such that when sealed with a seal at both ends thereof, a high-pressure water inlet is formed.

18. The brewing element of claim 17, wherein said tube is disposed perpendicular to and in firm contact with said perforated media.

19. The brewing element of claim 15, wherein said double blind-bore on one end thereof has inserted an open-ended tube, while on the other end of said double blind-bore a blocking cylinder is inserted to balance the axial force resulting from water pressure when high-pressure water is admitted into said open-ended tube.

20. The brewing element of claim 1, wherein said brewing ingredient comprises an espresso coffee.

21. The brewing element of claim 1, wherein said container is a cup.

* * * * *